June 30, 1931. A. H. HARRINGTON 1,812,632
FISHING APPARATUS
Filed June 10, 1930 2 Sheets-Sheet 1
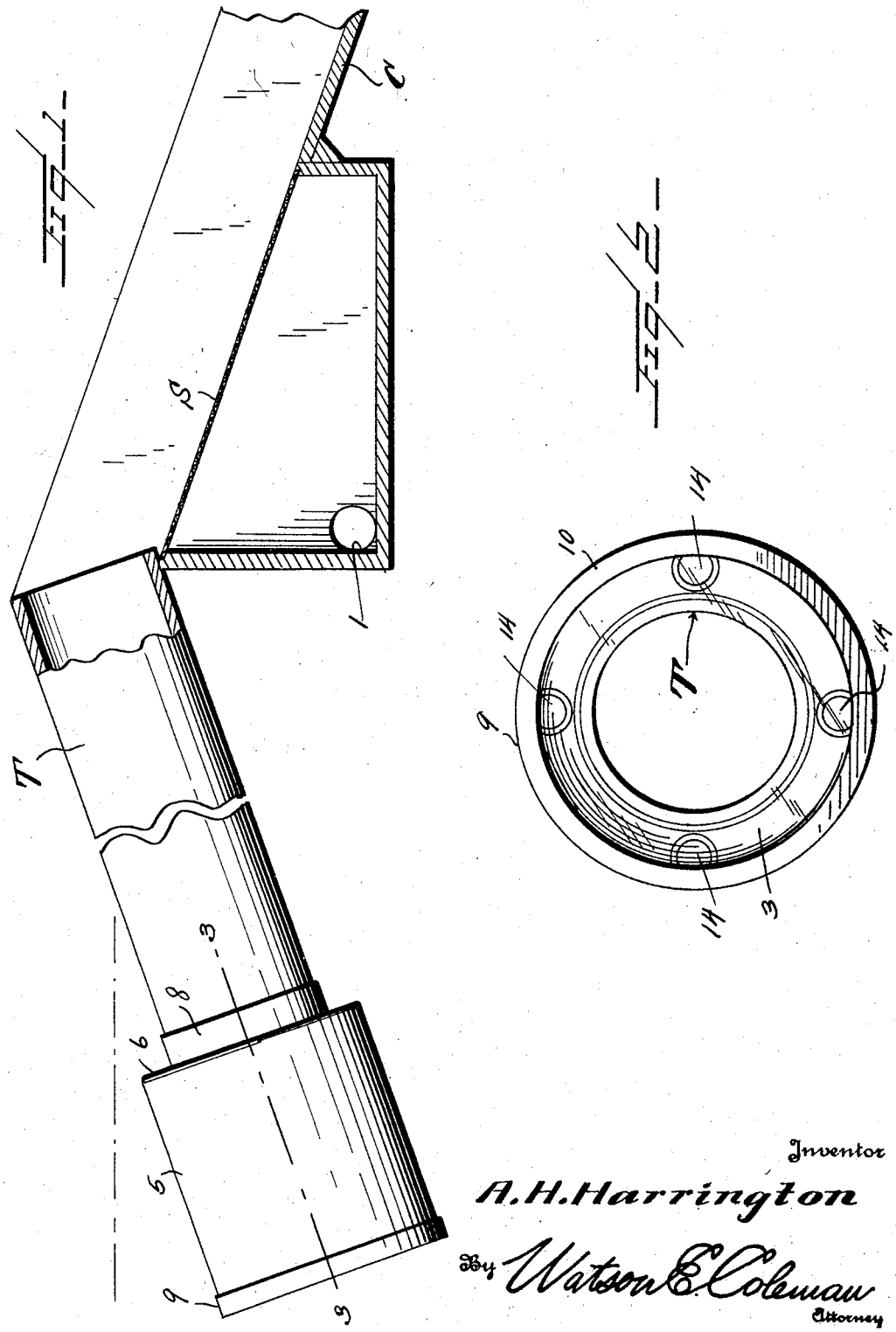
Inventor
A. H. Harrington
By Watson E. Coleman
Attorney

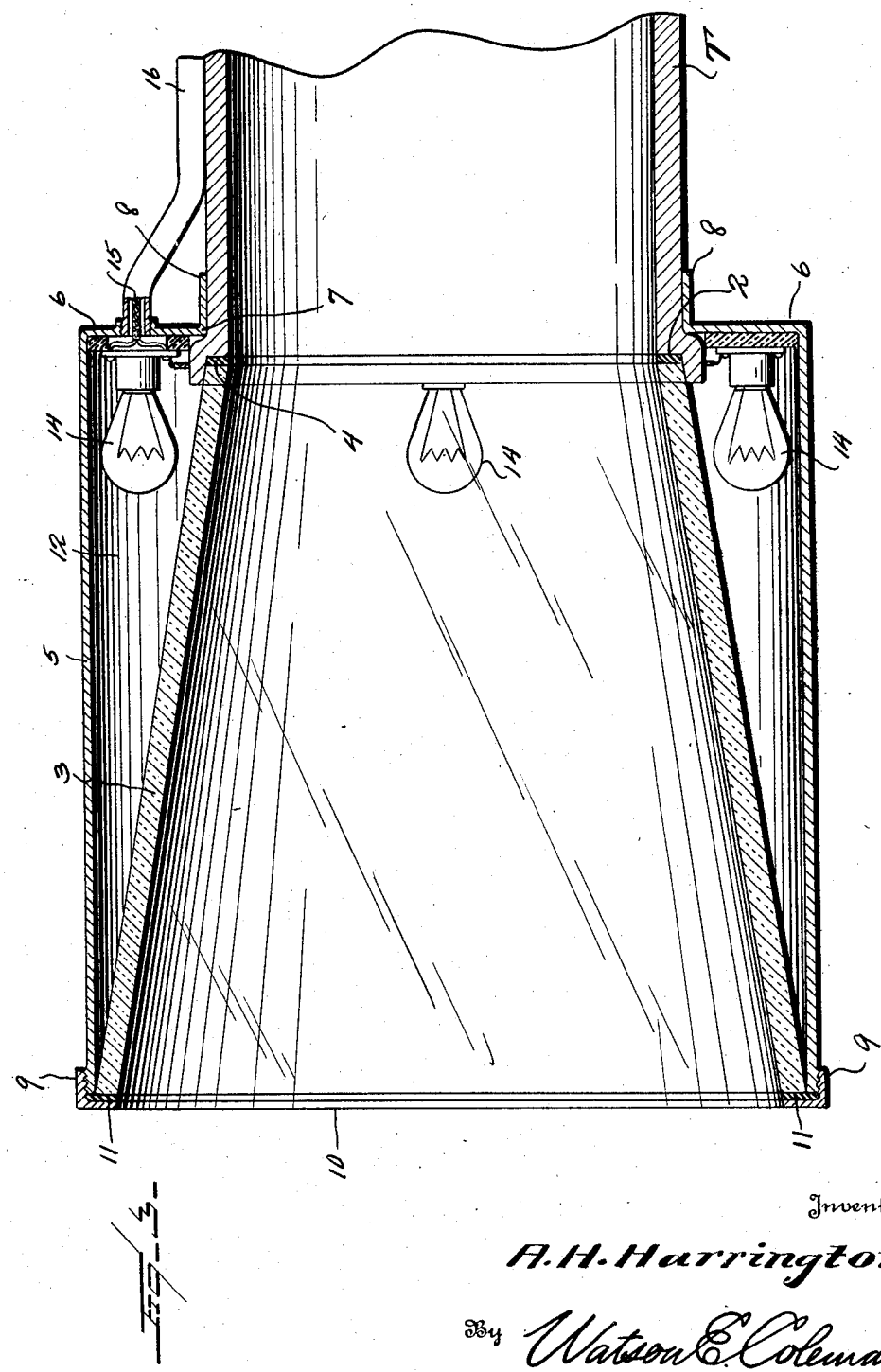

Patented June 30, 1931

1,812,632

UNITED STATES PATENT OFFICE

ALBERT H. HARRINGTON, OF BRIGHTON, BOSTON, MASSACHUSETTS

FISHING APPARATUS

Application filed June 10, 1930. Serial No. 460,249.

This invention relates to fishing apparatus, and it is an object of the invention to provide an apparatus of this kind comprising a collecting tube together with means directly associated with the entrance end of said tube for attracting fish thereto.

The invention also has for an object to provide an apparatus of this kind wherein illuminating means are employed for use in submergence for attracting fish to facilitate the capture of the same.

The invention consists in the details of construction and in the combination and arrangement of the several parts of my improved fishing apparatus whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view partly in section and partly in elevation and of a diagrammatic character illustrating a fishing apparatus constructed in accordance with an embodiment of my invention;

Figure 2 is a view in elevation of the outer end of the collecting tube as comprised in Figure 1;

Figure 3 is an enlarged detailed sectional view taken substantially on the line 3—3 of Figure 1.

As disclosed in the accompanying drawings, T denotes a tube of desired diameter and length and which is adapted to be mounted upon a boat in a manner to extend upwardly and inwardly thereof and to discharge upon a separating element or grating S positioned at the waist line of the boat, and which element or grating S is continued by a chute C intended to discharge within the hold of the boat. As the fish enter within the tube T they will be swept upwardly thereof and discharged upon the element or grating S, the fish passing thereover to the chute C and discharged within the hold of the boat. The water will pass through the element or grating S and is adapted to be discharged through the port 1 or the like overboard.

The outer or receiving end of the tube T is formed to provide a rabbet 2 which snugly receives the inner or smaller end portion of an outwardly flared sleeve or tube 3, the wall of which being of glass or other transparent material. Interposed between the base wall of the rabbet 2 and the adjacent inner end of the sleeve or tube 3 is a gasket 4 to assure a watertight joint.

The sleeve or tube 3 is surrounded by a metallic hood or casing 5 having an end plate 6 provided with a central opening 7 through which the outer end of the tube is snugly engaged. The opening 7 is defined by an inwardly disposed continuous flange 8 in close contact with the periphery of the tube T.

The outer end of the casing or hood 5 has close contact with the outer end of the sleeve or tube 3 and threaded upon the outer end of the casing or hood 5 is an annular member 9 provided with an inwardly disposed continuous flange 10 overlying the outer end or edge of the sleeve or tube 3. Interposed between the flange 10 and the outer edge or end of the sleeve or tube 3 and of the hood or casing 5 is a gasket 11 to assure a watertight joint.

The hood or casing 5 provides a chamber 12 surrounding the sleeve or tube 3 and the end plate 6 carries a series of illuminating units 14 spaced circumferentially around the sleeve or tube 3. As herein disclosed, the illuminating units 14 constitute conventional incandescent bulbs electrically connected in series and also in suitable connection through the conductors 15 with the desired source of electrical energy. The conductors 15 are disposed through a tubing 16 extending along the tube T as desired.

With the units 14 active light rays will pass through the wall of the sleeve or tube 3 assuring an effective illumination at the entrance end of the tube T and which illumination serves to attract the fish and more especially those species of fish known as "surface fish". This results in the desired capture of the fish.

From the foregoing description it is thought to be obvious that a fishing apparatus constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In a fishing apparatus, an elongated tube adapted to be mounted upon a boat with one end portion in submergence, a sleeve carried by the submerged end portion of the tube, the wall of said sleeve being transparent, and means for directing light rays through said wall of the sleeve.

2. In a fishing apparatus, an elongated tube adapted to be mounted upon a boat with one end portion in submergence, a sleeve carried by the submerged end portion of the tube, the wall of said sleeve being transparent, a hood surrounding the sleeve and providing a chamber therearound, and illuminating means within said chamber for directing light rays through the wall of the sleeve.

In testimony whereof I hereunto affix my signature.

ALBERT H. HARRINGTON.